(12) United States Patent
Lammers et al.

(10) Patent No.: US 6,605,715 B1
(45) Date of Patent: Aug. 12, 2003

(54) PROCESS FOR THE PREPARATION OF A STARCH ESTER

(75) Inventors: Geert Lammers, Harkstede (NL); Pertti Tiitola, Rajamäki (FI); Jani Vuorenpää, Marcq-En-Baroeul (FR)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 09/331,968

(22) PCT Filed: Dec. 31, 1997

(86) PCT No.: PCT/FI97/00838

§ 371 (c)(1),
(2), (4) Date: Aug. 18, 1999

(87) PCT Pub. No.: WO98/29455

PCT Pub. Date: Jul. 9, 1998

(30) Foreign Application Priority Data

Dec. 31, 1996 (FI) .................................................. 965306

(51) Int. Cl.$^7$ .............................................. C08B 31/02
(52) U.S. Cl. ..................... 536/107; 536/1.11; 536/2; 536/102; 536/106; 536/108; 536/110; 536/115; 536/116
(58) Field of Search ............................. 536/1.11, 2, 102, 536/106, 107, 108, 110, 115, 116

(56) References Cited

U.S. PATENT DOCUMENTS

| | | | | |
|---|---|---|---|---|
| 2,627,516 A | * | 2/1953 | Lohmar et al. |
| 2,860,132 A | * | 11/1958 | White et al. |
| 2,891,947 A | * | 6/1959 | Paschall et al. |
| 2,914,526 A | * | 11/1959 | Paschall |
| 3,281,411 A | * | 10/1966 | Lemmerling |
| 3,720,663 A | * | 3/1973 | Tessler et al. |
| 3,795,670 A | * | 3/1974 | Mark et al. |
| 3,839,320 A | * | 10/1974 | Bauer et al. |
| 4,501,888 A | * | 2/1985 | Schmidt |
| 4,720,544 A | * | 1/1988 | Schouten |

(List continued on next page.)

FOREIGN PATENT DOCUMENTS

| | | |
|---|---|---|
| AU | 5235893 B | 5/1994 |
| EP | 0603837 A1 | 6/1994 |

OTHER PUBLICATIONS

Kruger et al. Production and uses of starch acetates. In Starch: Chemistry and Technology vol. II (Eds. Bemiller and Roberts). Academic Press, New York (1967).*

Tessler, Martin M. et al. *Journal of Environmental Polymer Degradation*, vol. 4, No. 2, pp. 85–89, (1996).

(List continued on next page.)

*Primary Examiner*—Christopher L. Chin
(74) *Attorney, Agent, or Firm*—Birch, Stewart, Kolasch & Birch, LLP

(57) ABSTRACT

Process for the preparation of a starch ester, in particular a starch acetate, wherein a starch-based feedstock is reacted with an organic carboxylic acid anhydride in the presence of a catalyst. The reaction of the starch-based feedstock and the anhydride is performed at an excess pressure of about 0.1 to 50 bar in an essentially anhydrous medium containing 10% by weight of water at the most. As catalyst, sodium acetate, sodium hydroxide or sulphuric acid is used, and as the reaction medium, acetic acid or excess acetanhydride is used. By means of the invention, the duration of the esterification reaction can be significantly shortened, the separation of the product can be facilitated, and the recirculation of the waste solutions can be rendered more efficient.

20 Claims, 1 Drawing Sheet

U.S. PATENT DOCUMENTS 4,837,314 A * 6/1989 Eastman
5,321,132 A * 6/1994 Billmers et al.
5,514,790 A * 5/1996 Frische et al.
5,667,803 A * 9/1997 Paronen et al.
5,714,540 A * 2/1998 Tanaka et al.
5,714,601 A * 2/1998 Tanaka et al.
5,977,348 A * 11/1999 Harris et al.

OTHER PUBLICATIONS

Gros, Audrey T. et al. *The Journal of The American Oil Chemists' Society*, vol. 39, pp. 19–24, (Jan. 1962).

Journal of the American Chemical Society, vol. 73, 1951, Ivan A. Wolffe et al pp. 346–349.

* cited by examiner

PROCESS FOR THE PREPARATION OF A STARCH ESTER

This application is the national phase under 35 U.S.C. §371 of prior PCT International Application No. PCT/FI97/00838 which has an International filing date of Dec. 31, 1997 which designated the United States of America.

FIELD OF THE INVENTION

The present invention relates to a process according to the preamble of claim 1 for preparing starch esters.

According to such a process a starch-based feedstock is reacted with an organic carboxylic acid anhydride preferably in the presence of a catalyst.

GENERAL BACKGROUND

With a view to technical applications, the most important among starch esters are starch acetates and fatty acid esters of starch. Methods for the preparation of starch esters are described in the article by Tessler, M. M. and Bilimers, R. L., Preparation of Starch Esters, in Journal of Environmental Polymer Degradation 4 (1996) 85–89.

Starch acetates can be prepared by allowing (native) starch to react with acetic acid anhydride, i.e. acetanhydride, in the presence of a catalyst. As the catalyst, e.g. a 50% sodium hydroxide is used. The reaction is usually carried out in an aqueous suspension with a solvent such as pyridine or acetic acid anhydride. By varying the amount of the acetic acid anhydride, the amount of the base used as catalyst, and the reaction duration, starch acetates having different degrees of substitution can be prepared. The process described in U.S. Pat. No. 3,795,670, for example, represents the prior art.

The preparation of fatty acid esters of starch is performed, for instance, in the manner described in the following publications: Wolff, I. A., Olds, D. W. and Hilbert, G. E., The Acylation of Corn Starch, Amylose and Amylopectin, J. Amer. Chem. Soc. 73 (1952) 346–349, or Gros, A. T. and Feuge, R. O., Properties of Fatty Acid Esters of Amylose, J. Amer. Oil Chemists' Soc 39 (1962) 19–24.

The starch esters have usually been separated from the reaction mixture of the esterification reaction by precipitation.

The prior art processes have been hampered by the long reaction time required for the preparation, problems involved in the separation of the esters, and the recirculation of the mother liquor and the recovery of unreacted reactants.

OBJECT OF THE INVENTION

The present invention aims at eliminating the drawbacks related to the prior art and at achieving an entirely novel type of method for the preparation of starch esters.

Esterification is an exothermic reaction and the temperature of the reaction mixture will rise during the reaction until the boiling temperature of the medium is reached. The invention is based on the concept of performing the reaction between the starch-based feedstock and the anhydride at an excess pressure in an essentially anhydrous medium. Even a small rise in temperature (5–10° C.) significantly accelerates the reaction and reduces the reaction time by over 50%, typically from about 5 h to 2–3 h. Unexpectedly, no significant degradation of the starch has been observed in spite of the increase in temperature.

The invention is particularly well suited for the preparation of starch acetates whereby acetic acid anhydride is used as the actual reagent in the acetylation of starch, as solvent, acetic acid is sued, and as catalyst, sodium acetate, sodium hydroxide or sulfuric acid is used. Instead of the acetic acid solvent, excess acetanhydride can be used as the environment. Furthermore, acetic acid formed during the reaction can be used as the reaction medium. The starch usually comprises native barley starch but the process is also well suited for the actylation of other starches and starch derivatives. In addition, the process is characterized by only introducing an amount of acetanhydride corresponding to the desired DS, wherein DS is the degree of substitution.

BRIEF SUMMARY OF THE INVENTION

In more detail, the process according to the invention is mainly characterized by what is stated in the characterizing part of claim 1.

The invention provides considerable benefits. Thus, in the context of the process it is easier to control the reaction temperature than in a conventional unpressurized process. The same applies to controlling the viscosity of the reaction. Due to the elevated pressure the reaction time can be shortened because the reaction rate is dependent on the temperature. The regulation of the desired DS is easy because the substitution degree of the final product can be varied by varying the amount of carboxylic acid anhydride; thus, the consumption of the anhydride reagent can be optimized.

According to an advantageous embodiment of the invention, an anhydrous sodium acetate is used as catalyst whereby the amount of water in the reaction medium can be minimized. A controlled hydrolysation of starch is obtained by varying the temperature and the catalyst. The basic concept according to the invention makes a continuous process possible. In the precipitation of the product, several precipitants can be used, such as water and alkanols (e.g. ethanol). The precipitation of the product is made easier because there is less carboxylic acid in the reaction medium; this is because carboxylic acid dissolves particularly esters having a lower degree of substitution.

DESCRIPTION OF THE DRAWING

In the following the invention is examined in more detail by means of a detailed description and a number of working examples.

DETAILED DISCLOSURE OF THE INVENTION

Figure 1:
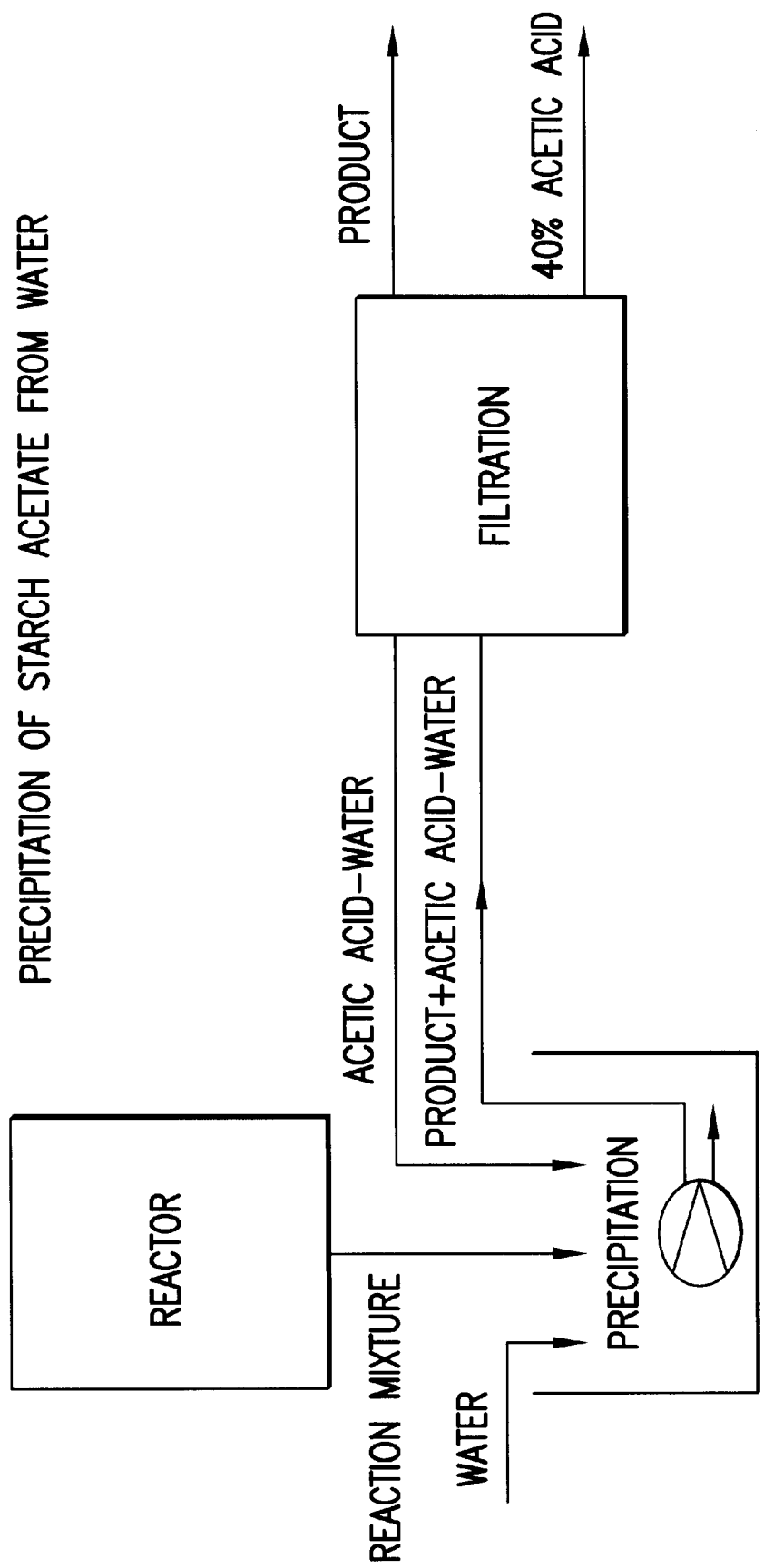
FIG. 1 shows a schematic representation of the precipitation of starch acetate from water.

The process of the invention comprises the following steps: reaction, precipitation, recirculation of acetic acid, filtration/wash, grinding and drying.

The Reaction

To start with, an amount of acetanhydride corresponding to DS 1.25 . . . 1.5 (if a lower DS is desired, less acetanhydride is used), together with the acetic acid, catalyst and starch, are introduced into a batch-type reactor. The reactor is closed and careful heating is begun. Acetic acid is usually present in an amount which is 1 . . . 300% of the amount of starch (depending on the parent starch and the reactor); acetic acid is used to regulate the viscosity of the reactor. Catalyst is used in an amount which is 15% of the amount of the starch at the most. Water is introduced into the reaction along with the other reactants. One seeks to avoid water but it is taken into account in the amounts of reagents, i.e. the more water, the greater the amount of other reactants. The reaction medium (carboxylic acid or excess carboxylic acid anhydride) is "essentially anhydrous" which means that the medium during the reaction does not contain more than 10% by weight of water. Most of the water is derived from the reactants (the equilibrium moisture content of native starch is about 10%) or water is gathered into the medium during the reaction (water is formed in the esterification reaction).

At about 80° C. the free water begins to react with the anhydride to form acetic acid whereby the pressure and temperature are significantly increased. The starch begins to gelatinize and react intensively at a temperature of 115 . . . 130° C. The excess pressure of the reaction is generally in the range from 0.01 to 100 bar, advantageously about 0.1 to 50 bar, and preferably about 0.5 to 5 bar. As will emerge from the examples below, the boiling of the reaction medium in a closed reactor usually gives rise to an excess pressure of about 1.5 to 3.5 which is sufficient to increase the reaction temperature to about 129 to 180° C. when the reaction medium consists of acetic acid/an acetic acid anhydride.

Even higher reaction temperatures may be used, whereby the reaction can, if desired, be carried out without catalyst. Pressures of 5 to 100 bar are advantageously achieved by using a gas atmosphere (e.g. a protecting gas atmosphere) for raising the pressure.

It is of advantage to maintain an even reaction temperature by cooling (the temperature with an acetic acid anhydride/acetic acid usually within a range from about 129 to 140° C.). When the temperature and pressure begin to sink a final batch of anhydride, if any, can be introduced into the reactor whereafter the temperature is kept at a desired value by cooling/heating (depending on the conditions: temperature, catalyst, starch and reactor) until all of the anhydrides have reacted.

In the process of the invention, the starch may be based on any native starch having an amylose content of 0 to 100% and an amylopectin content of 100 to 0%. Thus, the starch may be derived from barley, potato, wheat, oats, peas, maize, tapioca, sago, rice, or a similar tuber-bearing or grain plant. It can also be based on starches prepared from said native starches by oxidizing, hydrolyzing, cross-linking, cationizing, grafting, or etherifying.

According to the invention it is of advantage to prepare a starch ester which is derived from starch and one or several aliphatic $C_{2-24}$ carboxylic acids. Then the carboxylic acid component of such an ester may be derived from a lower alkane acid, such as acetic acid, propionic acid or butyric acid or a mixture thereof. The carboxylic acid component may, however, also be derived from a saturated or an unsaturated native fatty acid. As examples of these, palmitinic acid, stearic acid, oleic acid, linoleic acid and mixtures thereof may be mentioned. The ester may also be composed of both long- and short-chain carboxylic acid components. As an example, a mixed ester of acetate and stearate may be mentioned.

A starch acetate is advantageously prepared having a substitution degree of 0.5 to 3, advantageously 1.5 to 3 and preferably 2 to 3. Native barley starch or a modification thereof obtained, e.g. by enzymatic hydrolysis, is advantageously used for the preparation of starch esters, and as reagent, acetanhydride is used.

Precipitation

The precipitation can be carried out from e.g. ethanol, ether, or acetone (low DS grades). In general, however, the product is precipitated from water, whereby the recirculation of the water as well as that of the acetic acid is easy.

The precipitation is described in more detail in FIG. 1. The reaction mixture, fresh water and dilute acetic acid obtained from filtration are fed into the precipitator (the aim is to concentrate the acetic acid to a concentration of 40%). The precipitator comprises a tank furnished with a centrifugal pump and containing the precipitation medium (water). The pump is operative to both recirculate the slurry in the precipitation tank and to pump the product slurry to the filter in a continuous fashion.

As precipitator, also dispersers similar to a centrifugal pump may be used.

Recirculation of Acetic Acid

When acetic acid is used as the solvent, an about 40% acetic acid is obtained from the filtration which can be exploited in several ways:
1. Concentration (by extraction or by distillation), whereby the acetic acid can be recirculated back to the reaction.
2. Regeneration of the acetic acid into an anhydride whereby it could again be used for acetylation.
3. The acetic acid can also be used to produce raw materials for the chemical industry, such as calcium acetate.
4. The waste acetic acid can be exploited in the synthesis of triacetin. The dilute acetic acid solution is suited for the preparation of triacetin. A process based on azeotropic distillation can for instance be applied. Thus, toluene and glycerol and possibly a catalytic amount of para-toluene sulphonic acid are added into an approximately 40% acetic acid solution for distillation, whereafter the mixture is distilled in a manner known as such. By separating the aqueous phase and by evaporating the toluene from the organic phase a glycerol-acetic ester composition is obtained from which triacetin can be obtained at the stage where dissolution in water has not taken place by adding water and by phase separation, triacetin being useful as a plasticizer of starch derivatives.

Filtration/Wash

The starch acetate slurry is filtered after precipitation. During filtration, the acetic acid is recovered, the product is washed and at the same time as high a dry matter content as possible is striven for. The washing is performed with water through the filter cake. The washing water may be slightly alkaline or ammonia-containing in order to allow for the neutralization of the acid residues. Almost all filter types can be used for the filtration. In some types a problem is presented by channelling of the wash waters. Dry matter contents of the filter cake in some filter types;

| | |
|---|---|
| Drum filter | 20–30% |
| Pressure filter | 30–50% |
| Centrifugal filter | 40–70% |

Grinding

The degree of coarseness of the finished starch acetate powder varies depending on the manner of precipitation and the DS. The intended use and the need for easier handling may require that the product be ground. The choice of grinder/mill is, in addition to precipitation and the DS, also affected by the stage in the process at which the grinding is carried out. The acetate can be ground right after precipitation as a slurry, as wet precipitate after filtration, or as a dry product.

Drying

Dryers which can be used for drying starch acetate include fluidized bed, spray, chamber, vacuum and platform dryers. The drying is in principle easy but some starch acetate grades may melt already at a relatively low temperature (45° C.), particularly if acid residues have survived the wash.

By way of summarizing the above it can be concluded that, according to a preferred embodiment of the invention, a process is obtained for preparing a starch ester having a DS value in excess of approximately 1.5, according to which process an amount of carboxylic acid anhydride corresponding to the desired DS value is calculated, the starch-based feedstock is first reacted with an amount of the anhydride corresponding to a DS value of about 1.5 at the most, and the rest of the calculated amount of anhydride is added when the starch feedstock reaches a DS value of at least 1.2.

This solution is particularly well suited for the preparation of starch esters.

According to another preferred process which is also well suited for the preparation of starch acetates a closed reaction vessel furnished with cooling means is employed, a reaction mixture is formed containing the starch-based feedstock, the carboxylic acid anhydride, and, optionally, the solvent and the catalyst, the reaction mixture is heated in the reaction vessel to a temperature of about 70 to 100° C., the starch-based feedstock is allowed to react with the carboxylic acid anhydride, the reaction mixture is cooled in order to maintain its temperature at 129–180° C., the reaction mixture is recovered and the starch ester is precipitated from the reaction mixture.

The following non-limiting examples are provided by way of illustrating the invention in more detail.

Test Apparatus (Reactor)

The apparatus used comprised a reactor whose volume is 0,43 m$^3$ and whose maximum service pressure is an excess pressure of 10 bar. The reactor is heated with steam and cooled with cold water. The mixer is a spiral mixer of the "helical" type, driven by an 18.5 kW motor. Its maximum rotation speed is 180 rev/min. The reactor is emptied using a mohno pump suited for materials of high viscosity.

WORKING EXAMPLES

Examples 1 and 2

As catalyst, NaOH; desired D.S. 2.5 and 3.0; initial starch material native barley starch.

Metering of reactants, catalyst and solvent as indicated in Table 1:

TABLE 1

| Ex. | Starch/ kg | Anhydr./ init. charge/ kg | Anhydr./ rest/ kg | Catalyst/ weight/ kg | Acetic acid/ kg | Water/ kg | Max. DS |
|---|---|---|---|---|---|---|---|
| 1 | 54 | 88 | 64 | NaOH/3 | 101 | 10 | 2.5 |
| 2 | 65 | 123 | 71 | NaOH/3.23 | 90 | 11 | 3.0 |

Examples 3 to 6

In examples 3 to 6, sodium acetate was used as the catalyst in varying amounts. The reaction temperature was also changed. The examples illustrate changes in reaction velocity and in the hydrolyzation of the starch as a function of these parameters.

TABLE 2

| Ex. | Starch/ kg | Anhydr./ init. charge/ kg | Anhydr./ rest/ kg | Catalyst/ weight/ kg | Acetic acid/ kg | Water/ kg | Max. DS |
|---|---|---|---|---|---|---|---|
| 3 | 65 | 92 | 51 | Na-ac/6.59 | 88 | 7 | 2.5 |
| 4 | 65 | 93 | 66 | Na-ac/4.85 | 89 | 7 | 2.9 |
| 5 | 65 | 93 | 71 | Na-ac/9.7 | 89 | 8 | 3.0 |
| 6 | 65 | 93 | 71 | Na-ac/3.23 | 89 | 7 | 3.0 |

Example 7

As in Examples 1 to 6, except that sulphuric acid was used as the catalyst. Sulphuric acid possesses intensive hydrolyzation properties.

The results are indicated in Table 3.

TABLE 3

| Ex. | Starch/ kg | Anhydr./ init. charge/ kg | Anhydr./ rest/ kg | Catalyst/ weight/ kg | Acetic acid/ kg | Water/ kg | Max. DS |
|---|---|---|---|---|---|---|---|
| 7 | 63 | 82 | 80 | H$_2$SO$_4$/0.175 | 89 | 7 | 3.0 |

Example 8

Example 8 shows how the amount of anhydride, that is, restricting the amount of anhydride, can be exploited to control the degree of substitution (DS). The results are shown in Table 4.

TABLE 4

| Ex. | Starch/ kg | Anhydr./ init. charge/ kg | Anhydr./ rest/ kg | Catalyst/ weight/ kg | Acetic acid/ kg | Water/ kg | Max. DS |
|---|---|---|---|---|---|---|---|
| 8 | 90 | 137 | 0 | Na-ac/4.5 | 103 | 10 | 1.4 |

Examples 9 to 11

Examples 9 to 11 inspect the properties of the reactor by, among other things, reducing the amount of acetic acid which is used as solvent. The results are indicated in Table 5.

TABLE 5

| Ex. | Starch/ kg | Anhydr./ init. charge/ kg | Anhydr./ rest/ kg | Catalyst/ weight/ kg | Acetic acid/ kg | Water/ kg | Max. DS |
|---|---|---|---|---|---|---|---|
| 9 | 54 | 83 | 60 | Na-ac/5.3 | 59 | 7 | 3.0 |
| 10 | 65 | 97 | 71 | Na-ac/6.5 | 51 | 8 | 3.0 |
| 11 | 65 | 94 | 70 | Na-ac/6.4 | 37 | 8 | 3.0 |
| 12* | 54 | 237 | 0 | NaOH/4 | 0 | 17 | 5.9 |

*Reference reaction carried out by a conventional (unpressurized) process.

COMPARATIVE PRESENTATION OF REACTION CONDITIONS AND PRODUCT ANALYSES WITH REFERENCE TO EXAMPLES 1 to 12

The reaction conditions and product analyses are as indicated in Table 6.

TABLE 6

| Ex. | Max. temp./ °C. | Max. excess pressure/ bar | Reaction time/ h:min | DS | Free acid/ mmol/g | Melt index 300 l/s |
|---|---|---|---|---|---|---|
| 1 | 153 | 2.16 | 2:20 | 2.3 | 0.008 | |
| 2 | 147 | 1.7 | 2:00 | 2.7 | 0.012 | 22 |
| 3 | 158 | 2.61 | 2:55 | 2.69 | 0.009 | 39 |
| 4 | 151 | 2.25 | 1:45 | 2.66 | 0.015 | 70 |
| 5 | 140 | 1.85 | 3:20 | 2.5 | 0.006 | |
| 6 | 138 | 1.97 | 3:40 | 2.5 | 0.006 | 58 |
| 7 | 171 | 3.13 | 0:37 | 1.8 | 0.012 | |
| 8 | 141 | 2.52 | 2.17 | 2.14 | 0.011 | |
| 9 | 123* | 2.8 | 2:18 | 3 | 0.011 | 29 |
| 10 | 120* | 2.1 | 1:53 | 2.9 | 0.009 | 36 |
| 11 | 105* | 2.6 | 3:09 | 2.2 | 0.004 | |
| 12** | 128** | 0 | 5:00 | 2.3 | 0.001 | 75 |

*The temperature in the examples does not correspond to the real temperature because the temperature sensor was too slow. The phenomenon was due to the high viscosity of the reaction mixture.
**Reference reaction carried out according to a known process.

DS determination: a 72-hour hydrolysis in potassium hydroxide.

The melt index describes the melt viscosity of starch acetates prepared according to the Examples at a certain shear rate. The procedure for determining the melt index is as follows: a dry starch acetate powder prepared according to the example is plasticized with 23.08% by w. of triacetin at a melt temperature of 180° C. using a Berstorff ZE25 double-screw extruder, whereafter the product is granulated.

The melt viscosity of the obtained plasticized and granulated starch acetate is then determined using a Brabender Plasti-Corder P2006 melt mixer which is equipped with a single-screw extruder 19/20 D and a planar capillary rheometry die at 190° C. applying five different speeds of rotation of the screw (5, 10, 20, 40 and 80 1/min).

The melt viscosity value (Pas) corresponding to a shear rate of 300l/min has been picked from the graphs illustrating the melt viscosity as a function of shear rate of the materials thus obtained, and it is this value which is indicated as the melt index in the tables provided in the examples.

What is claimed is:

1. A process for the preparation of a starch ester comprising
   reacting a starch-based feedstock with an organic carboxylic acid anhydride in the presence of a catalyst, at an excess pressure of 0.01 to 100 bar and a temperature range of 115° C. to 180° C. in an essentially anhydrous medium.

2. The process of claim 1, characterized in that the pressure is about 0.1 to 50 bar.

3. The process of claim 1 or 2, characterized in that the medium contains 10% by weight of water at the most.

4. The process of claim 1, characterized in that as the medium, organic carboxylic acid anhydride is used.

5. The process of claim 1, characterized in that as the medium, an organic carboxylic acid corresponding to the acid anhydride is used.

6. The process of claim 5, wherein said organic carboxylic acid is used in an amount of 1 to 300% of the dry weight of said starch-based feedstock.

7. The process of any one of the claims 4 to 6, characterized in that as the carboxylic acid anhydride, an acetic acid anhydride is used, and as the carboxylic acid, acetic acid is used.

8. The process of claim 7, characterized in that the process is carried out at a temperature of 129 to 180° C.

9. The process of claim 1, characterized in that as the catalyst, sodium acetate, sodium hydroxide, or sulphuric acid is used.

10. The process of claim 9, characterized in that the catalyst is used in an amount of 15% of the dry weight of said starch-based feedstock at the most.

11. The process of claim 1, characterized in that the starch-based feedstock is one or more selected from the group consisting of native starch, oxidized starch, hydrolyzed starch, cross-linked starch and cationic starch.

12. The process of claim 1, characterized in that as the starch-based feedstock, a starch derivative with some free hydroxyl groups is used.

13. The process of claim 12, characterized in that as the starch derivative, a starch ether is used.

14. The process of claim 1 for the preparation of a starch ester with a DS value exceeding about 1.5, characterized in that an amount of carboxylic acid anhydride corresponding to the desired DS value is calculated, the starch-based feedstock is first reacted with an amount of anhydride corresponding to a DS value of about 1.5 at the most, and after the base starch has reached a DS value of at least 1.2, the rest of the calculated amount of anhydride is added.

15. The process of claim 1, characterized in that it comprises the following process steps:

a closed reaction vessel is used equipped with cooling means, a reaction mixture is formed comprising the starch-based feedstock, the carboxylic acid anhydride, the reaction mixture is heated in the reaction vessel to a temperature of about 70 to 100° C., the starch-based feedstock is reacted with the carboxylic acid anhydride, the reaction mixture is cooled to maintain its temperature at 129 to 180° C., the reaction mixture is recovered, and the starch ester is precipitated from the reaction mixture.

16. The process of claim 15, characterized in that the starch ester is precipitated from the reaction mixture using water or alkanol.

17. The process of claim 10, characterized in that the mother liquor of the filtration is recovered.

18. The process of claim 17, characterized in that the mother liquor is used to produce triacetin.

19. The process of claim 15 wherein said reaction mixture further comprises a solvent and a catalyst.

20. The process of claim 15 wherein the starch ester is precipitated from the reaction mixture by (a) combining the reaction mixture with one precipitation medium selected from the group consisting of water and alkanol;

(b) feeding the mixture from step (a) into a precipitator comprising a tank furnished with a centrifugal pump and containing precipitation medium;

(c) re-circulating the slurry in the precipitation tank; and (d) pumping the product slurry into a filter to yield a mother liquor and a starch acetate.

* * * * *